(12) United States Patent
Liao et al.

(10) Patent No.: US 9,946,916 B2
(45) Date of Patent: Apr. 17, 2018

(54) CAPACITIVE FINGERPRINT SENSOR AND SENSING PANEL THEREOF

(71) Applicant: Chunghwa Picture Tubes, LTD., Taoyuan (TW)

(72) Inventors: Jhen-Shen Liao, Taoyuan (TW); Hung-Hsiang Chen, Taoyuan (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 5 days.

(21) Appl. No.: 15/225,255

(22) Filed: Aug. 1, 2016

(65) Prior Publication Data
US 2018/0005013 A1    Jan. 4, 2018

(30) Foreign Application Priority Data

Jun. 29, 2016   (CN) .......................... 2016 1 0493087

(51) Int. Cl.
*G06K 9/00*    (2006.01)
*G06K 9/40*    (2006.01)

(52) U.S. Cl.
CPC ....... *G06K 9/00067* (2013.01); *G06K 9/0002* (2013.01); *G06K 9/40* (2013.01)

(58) Field of Classification Search
USPC ........................................................ 382/124
See application file for complete search history.

(56) References Cited

U.S. PATENT DOCUMENTS

| 5,978,496 | A | 11/1999 | Harkin | |
|---|---|---|---|---|
| 8,669,843 | B2 * | 3/2014 | Chen | G06K 9/0002 340/5.53 |
| 2008/0130835 | A1 * | 6/2008 | Peterson | A61B 6/4464 378/117 |
| 2010/0073320 | A1 * | 3/2010 | Liao | G06F 3/044 345/174 |
| 2011/0068848 | A1 * | 3/2011 | Chuang | G06G 7/186 327/345 |
| 2012/0139867 | A1 * | 6/2012 | Chang | G06F 3/0416 345/174 |
| 2012/0256644 | A1 * | 10/2012 | Fujiyoshi | G06F 3/044 324/679 |

(Continued)

FOREIGN PATENT DOCUMENTS

TW    M516193    1/2016

*Primary Examiner* — Jerome Grant, II
(74) *Attorney, Agent, or Firm* — J.C. Patents

(57) ABSTRACT

A capacitive fingerprint sensor and a sensing panel are provided. The capacitive fingerprinting sensor includes a sensing circuit, a level switch, an output switch. The sensing circuit has a first capacitor providing a sensing voltage according to a first sensing driving signal. A control terminal of the level switch is coupled to the sensing circuit to receive the sensing voltage, a first terminal thereof receives a high voltage level, and a second terminal thereof provides a sensing determination signal. A control terminal of the output switch receives a second sensing driving signal, a first terminal thereof is coupled to the second terminal of the level switch to receive the sensing determination signal, and a second terminal thereof is coupled to a data line. The sensing determination signal is provided through the level switch to avoid a parasitic capacitance on a trace influencing a voltage level of the sensing determination signal.

6 Claims, 3 Drawing Sheets

(56) References Cited

U.S. PATENT DOCUMENTS

| | | | | |
|---|---|---|---|---|
| 2014/0333852 A1* | 11/2014 | Ishikawa | ............... | G06F 3/044 |
| | | | | 349/12 |
| 2017/0116452 A1* | 4/2017 | Wang | ............... | G06K 9/0002 |
| 2017/0160862 A1* | 6/2017 | Suzuki | ............... | G06F 3/0412 |
| 2017/0255808 A1* | 9/2017 | Hsu | ............... | G06K 9/0002 |

* cited by examiner

CAPACITIVE FINGERPRINT SENSOR AND SENSING PANEL THEREOF

CROSS-REFERENCE TO RELATED APPLICATION

This application claims the priority benefit of China application serial no. 201610493087.X, filed on Jun. 29, 2016. The entirety of the above-mentioned patent application is hereby incorporated by reference herein and made a part of this specification.

BACKGROUND OF THE INVENTION

Field of the Invention

The invention relates to a sensor, and particularly relates to a capacitive fingerprint sensor and a sensing panel thereof.

Description of Related Art

Along with booming development of mobile devices, fingerprint recognition techniques are introduced into the mobile devices to facilitate consumers getting more convenient user experience, and also contribute to the gradual warming of fingerprinting recognition market. The commonly used fingerprint recognition techniques include capacitive, optical, ultrasonic and heating fingerprint recognition techniques, in which the capacitive fingerprint recognition technique is the most popular one.

The capacitive fingerprint recognition technique is further divided into active capacitive fingerprint recognition technique and passive capacitive fingerprint recognition technique, and the passive capacitive fingerprint recognition technique may directly detect a magnitude of a sensing capacitance according to a characteristic that a peak portion and a valley portion of a fingerprint have different sensing capacitances, so as to recognize a texture feature of the fingerprint. In the active capacitive fingerprint recognition technique, a sensing electrode is adopted to detect a radio frequency (RF) signal transmitted by the finger, and since the RF signal have different intensities under different sensing capacitances, a texture feature of the fingerprint is recognized.

SUMMARY OF THE INVENTION

The invention is directed to a capacitive fingerprint sensor and a sensing panel thereof, by which a parasitic capacitance on a trace is avoided to influence a voltage level of a sensing determination signal.

The invention provides a capacitive fingerprint sensor including a sensing circuit, a level switch and an output switch. The sensing circuit has a first capacitor, where the first capacitor provides a sensing voltage according to a first sensing driving signal. A control terminal of the level switch is coupled to the sensing circuit to receive the sensing voltage, a first terminal final of the level switch receives a high voltage level, and a second terminal of the level switch provides a sensing determination signal. A control terminal of the output switch receives a second sensing driving signal, a first terminal of the output switch is coupled to the second terminal of the level switch to receive the sensing determination signal, and a second terminal of the output switch is coupled to a data line.

The invention provides a sensing panel including a plurality of driving lines, a plurality of data lines and a plurality of the aforementioned capacitive fingerprint sensors. The capacitive fingerprint sensors are respectively coupled to a first driving line and a second driving line in the driving lines and a corresponding data line, and provide a sensing determination signal to the corresponding data line according to a first sensing driving signal transmitted by the first driving line and a second sensing driving signal transmitted by the second driving line.

According to the above description, in the capacitive fingerprint sensor and the sensing panel thereof, the sensing determination signal is provided through the level switch, such that a parasitic capacitance on a trace is avoided to influence a voltage level of the sensing determination signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
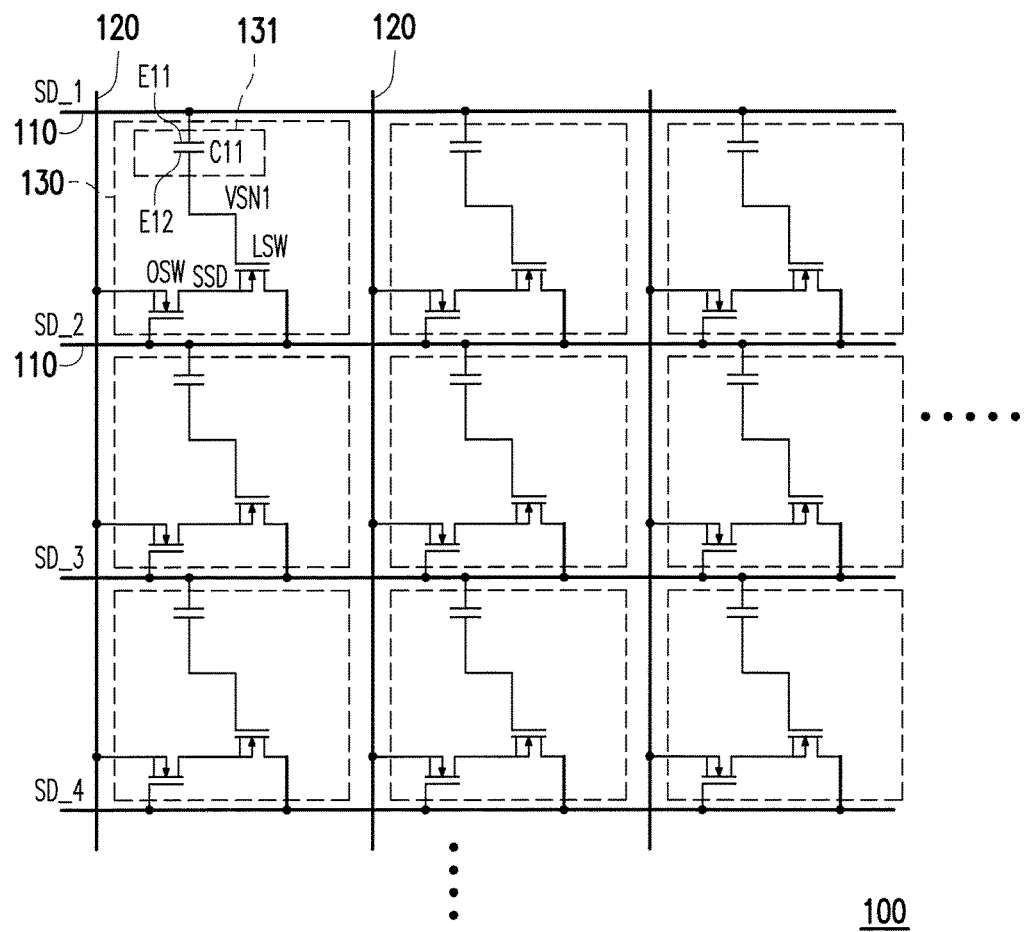
FIG. 1 is a circuit schematic diagram of a sensing panel according to an embodiment of the invention.

FIG. 1 is a circuit schematic diagram of a sensing panel according to an embodiment of the invention. Referring to FIG. 1, in the present embodiment, the sensing panel 100 includes a plurality of driving lines 110, a plurality of data lines 120 and a plurality of capacitive fingerprint sensors 130, where the capacitive fingerprint sensors 130 are arranged in an array, and the driving lines 110 and the data lines 120 are all straight lines and are intersected to each other.

The capacitive fingerprint sensors 130 are respectively coupled to a first driving line (for example, the driving line 110 transmitting a sensing driving signal SD_1) and a second driving line (for example, the driving line 110 transmitting a sensing driving signal SD_2) in the driving lines 110 and the corresponding data line 120, so as to provide a sensing determination signal SSD to the corresponding data line 120 according to a first sensing driving signal (for example, the sensing driving signal SD_1) transmitted by the first driving line and a second sensing driving signal (for example, the sensing driving signal SD_2) transmitted by the second driving line.

Further, each of the capacitive fingerprint sensors 130 includes a sensing circuit 131, a level switch (for example, a transistor LSW) and an output switch (for example, a transistor OSW). The sensing circuit 141 includes a first capacitor C11, where the first capacitor C11 is coupled between the driving line 110 used for transmitting the first sensing driving signal (for example, the sensing driving signal SD_1) and a gate (corresponding to a control terminal of the level switch) of the transistor LSW, i.e. the first capacitor C11 may provide a sensing voltage VSN1 according to the sensing driving signal SD_1.

The gate of the transistor LSW is coupled to the sensing circuit 131 to receive the sensing voltage VSN1, a drain (corresponding to a first terminal of the level switch) of the transistor LSW receives the sensing driving signal SD_2, and a source (corresponding to a second terminal of the level switch) of the transistor LSW provides the sensing determination signal SSD. A gate (corresponding to a control terminal of the output switch) of the transistor OSW receives the sensing driving signal SD_2, a drain (corresponding to a first terminal of the output switch) of the transistor OSW is coupled to the source of the transistor LSW to receive the sensing determination signal SSD, and a source (corresponding to a second terminal of the output switch) of the transistor OSW is coupled to the corresponding data line 120. The sensing determination signal SSD is a digital signal, such that the sensing determination signal SSD can be directly provided to a post end for determination.

In the present embodiment, the first capacitor C11 includes a first electrode E11 and a second electrode E12, where the first electrode E11 is coupled to the corresponding driving line 110 and is coupled with the fingerprint to form an equivalent capacitor, and the second electrode E12 is coupled to the gate of the transistor LSW and is used for forming a stable capacitance with the first electrode E11 to resist noise interference caused by other signals.

In the present embodiment, it is assumed that the sensing driving signals (for example, SD_1-SD_4) are sequentially enabled, and the capacitive fingerprint sensor 130 with detailed components shown in FIG. 1 is taken as an example for description. When the sensing driving signal SD_1 is enabled (for example, the sensing driving signal SD_1 has a high voltage level), the other sensing driving signals (for example, SD_2-SD_4) are disabled (for example, the other sensing driving signals SD_2-SD_4 have a low voltage level). Now, the capacitive fingerprint sensor 130 is in a sensing period, and the first capacitor C11 receiving the sensing driving signal SD_1 is coupled with the high voltage level of the sensing driving signal SD_1 to raise a voltage level of the sensing voltage VSN1.

A raising range of the sensing voltage VSN1 relates to the equivalent capacitor between the first electrode E11 and the fingerprint. When the equivalent capacitor between the first electrode E11 and the fingerprint is higher, the raising range of the sensing voltage VSN1 is lower, and when the equivalent capacitor between the first electrode E11 and the fingerprint is lower or none, the raising range of the sensing voltage VSN1 is higher.

Then, when the sensing driving signal SD_2 is enabled (for example, the sensing driving signal SD_2 has the high voltage level), the other sensing driving signals (for example, SD_1, SD_3, SD_4) are disabled (for example, the sensing driving signals SD_1, SD_3, SD_4 have the low voltage level). Now, the capacitive fingerprint sensor 130 is in a reading period, and the turned on transistor OSW may transmit the sensing determination signal SSD to the corresponding data line 120. When the sensing voltage VSN1 is higher than or equal to a threshold voltage for turning on the transistor LSW, the transistor LSW is turned on, such that the sensing determination signal SSD has the high voltage level (which can be regarded to have logic "1"); and when the sensing voltage VSN1 is lower than the threshold voltage for turning on the transistor LSW, the transistor LSW is turned off, such that the sensing determination signal SSD has the low voltage level (which can be regarded to have logic "0").

In the present embodiment, the drain of the transistor LSW receives the sensing driving signal SD_2 in order to receive the high voltage level of the sensing driving signal SD_2 during the reading period, though in other embodiments, the drain of the transistor LSW may directly receive the high voltage level, which can be determined by those skilled in the art. Moreover, the reading period of the capacitive fingerprint sensor 130 can be next to the sensing period of the capacitive fingerprint sensor 130.

Figure 2:
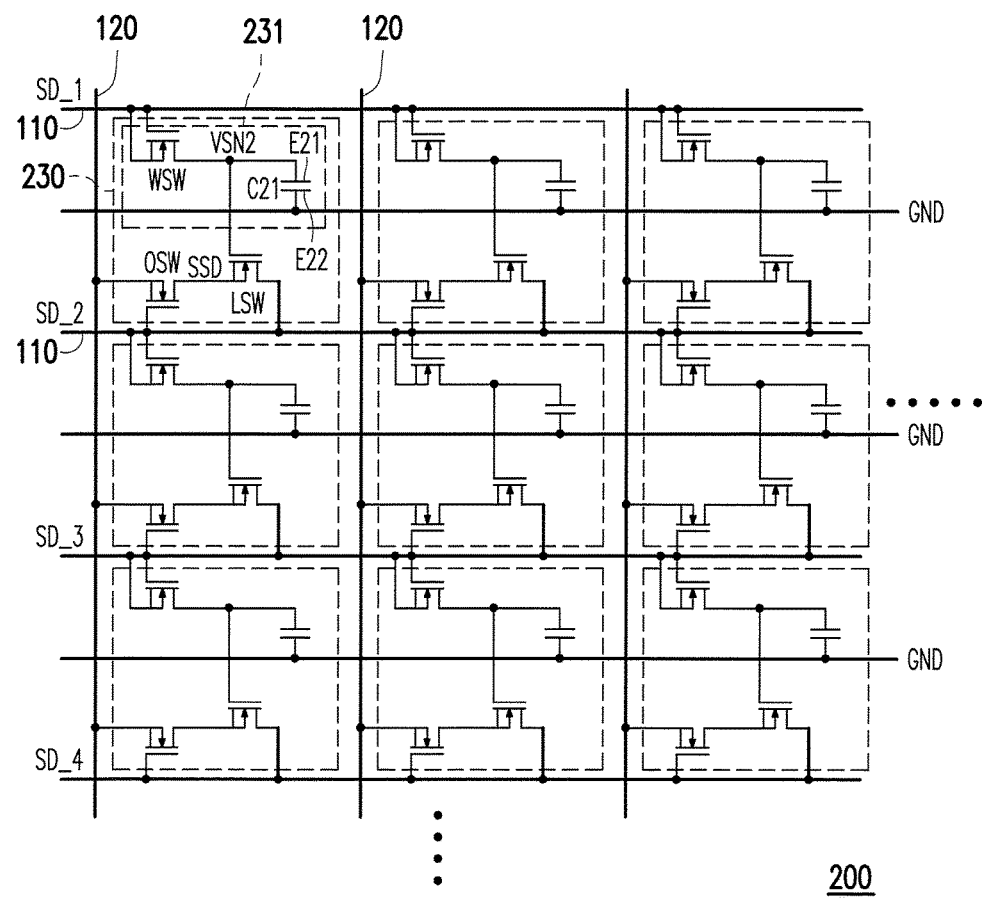
FIG. 2 is a circuit schematic diagram of a sensing panel according to another embodiment of the invention.

FIG. 2 is a circuit schematic diagram of a sensing panel according to another embodiment of the invention. Referring to FIG. 1 and FIG. 2, the sensing panel 200 is substantially similar to the sensing panel 100, and a difference there between lies in a sensing circuit 231 of a capacitive fingerprint sensor 230, where the same or similar components are denoted by the same or similar referential numbers. In the present embodiment, the sensing circuit 231 includes a writing switch (for example, a transistor WSW) and a first capacitor C21. A gate and a source of the transistor WSW (corresponding to a control terminal and a first terminal of the writing switch) are coupled to the driving line 110 used for transmitting the sensing driving signal SD_1 to receive the sensing driving signal SD_1, and the first capacitor C21 is coupled between a drain of the transistor WSW (corresponding to a second terminal of the writing switch) and a common voltage (for example, a ground voltage GND). The first capacitor C21 includes a first electrode E21 and a second electrode E22, and the first electrode E21 is coupled to the drain of the transistor WSW, and the second electrode E22 is coupled to the ground voltage GND.

In the present embodiment, it is assumed that the sensing driving signals (for example, SD_1-SD_4) are sequentially enabled, and the capacitive fingerprint sensor 230 with detailed components shown in FIG. 2 is taken as an example for description. When the sensing driving signal SD_1 is enabled (for example, the sensing driving signal SD_1 has the high voltage level), the other sensing driving signals (for example, SD_2-SD_4) are disabled (for example, the other sensing driving signals SD_2-SD_4 have the low voltage level). Now, the capacitive fingerprint sensor 230 is in a sensing period, and the first capacitor C21 receiving the sensing driving signal SD_1 is charged by the high voltage level of the sensing driving signal SD_1 to raise a voltage level of the sensing voltage VSN2.

A raising range of the sensing voltage VSN2 relates to the equivalent capacitor between the first electrode E21 and the fingerprint. When the equivalent capacitor between the first electrode E21 and the fingerprint is higher, the raising range of the sensing voltage VSN2 is lower, and when the equivalent capacitor between the first electrode E21 and the fingerprint is lower or none, the raising range of the sensing voltage VSN2 is higher. Operation detail of the capacitive fingerprint sensor 230 is similar to that of the capacitive fingerprint sensor 130, which may refer to related description of FIG. 1, and detail thereof is not repeated.

Figure 3:
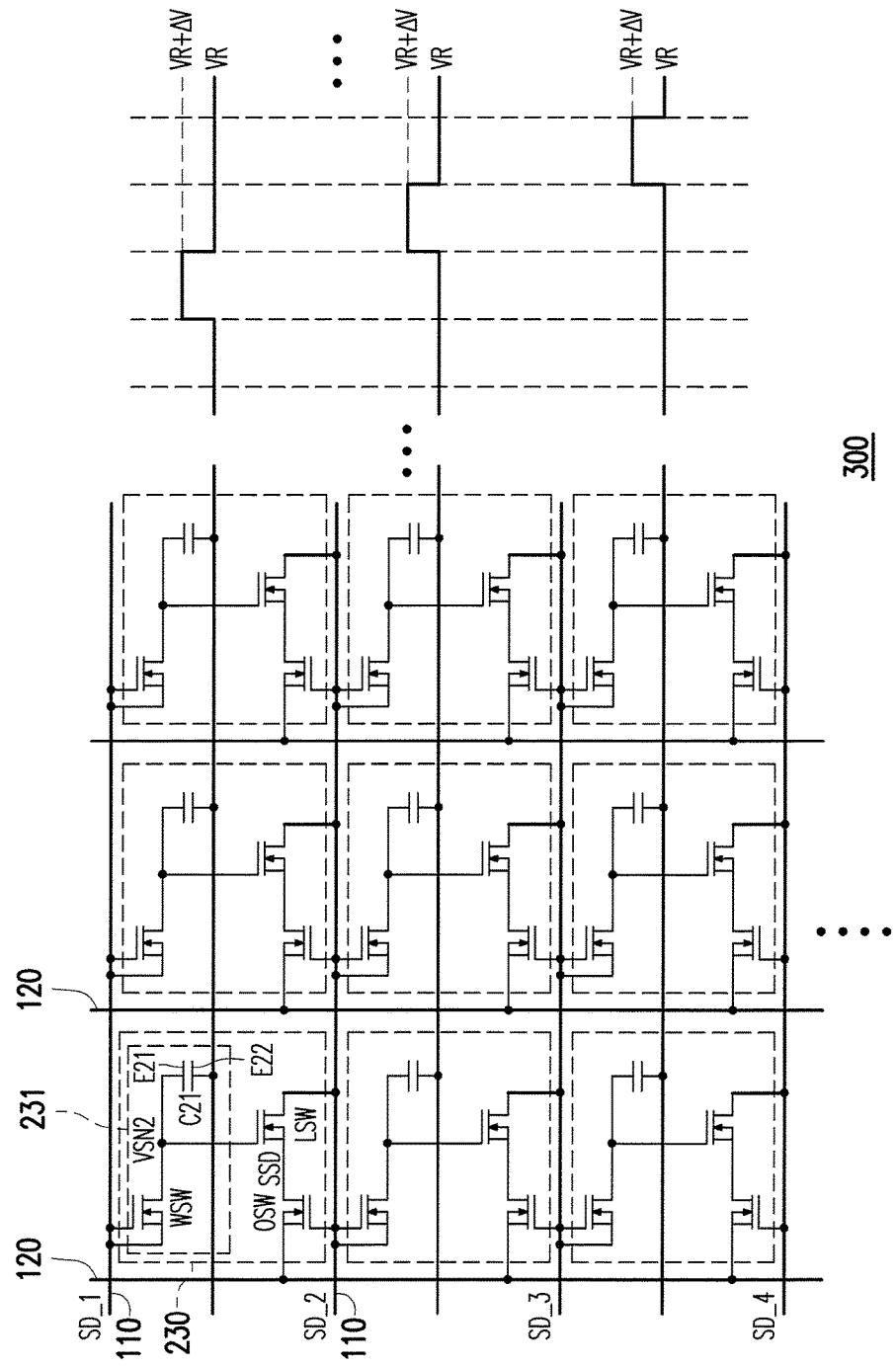
FIG. 3 is a circuit schematic diagram of a sensing panel according to another embodiment of the invention.

FIG. 3 is a circuit schematic diagram of a sensing panel according to another embodiment of the invention. Referring to FIG. 2 and FIG. 3, the sensing panel 300 is substantially similar to the sensing panel 200, and a difference there between lies in the common voltage received by the first capacitor C21 of the capacitive fingerprint sensor 230, where the same or similar components are denoted by the same or similar referential numbers. In the present embodiment, the common voltage received by the first capacitor C21 is sequentially a reference voltage VR, and the reference voltage VR plus a compensation voltage $\Delta V$. Namely, the common voltage received by the first capacitors C21 of each row of the capacitive fingerprint sensor 230 in the corresponding reading period is the reference voltage VR plus the compensation voltage ΔV, where the compensation voltage ΔV can be smaller than a half of the threshold voltage for turning on the transistor LSW. Conversely, the common voltage received by the first capacitors C21 of each row of the capacitive fingerprint sensor 230 in other periods (including the corresponding sensing period) is the reference voltage VR, where the reference voltage VR can be any voltage level.

In summary, in the capacitive fingerprint sensor and the sensing panel thereof of the invention, the sensing determination signal is provided through the level switch, so as to avoid the situation that the parasitic capacitance on the trace influences the voltage level of the sensing determination signal. Moreover, the capacitive fingerprint sensor uses three transistors and one capacitor at most, so that the first electrode with a larger area can be used (i.e. a sensing area of the capacitive fingerprint sensor can be increased). Moreover, the second layer of electrode layer can be adopted to form the sensing panel, so as to decrease the manufacturing cost. In addition, the sensing panel can be driven by the sequentially enabled sensing driving signals, which is the same with a driving method of a display panel, so that it can be integrated with a panel gate driving circuit to decrease the manufacturing cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A capacitive fingerprint sensor, comprising:
    a sensing circuit, having a first capacitor and a writing switch, wherein the first capacitor provides a sensing voltage according to a first sensing driving signal, and a control terminal and a first terminal of the writing switch are coupled to a first driving line to receive the first sensing driving signal transmitted by the first driving line, and the first capacitor is coupled between a second terminal of the writing switch and a common voltage, wherein the common voltage is a reference voltage during a sensing period, and the common voltage is a sum of the reference voltage and a compensation voltage during a reading period;
    a level switch, having a control terminal coupled to the sensing circuit to receive the sensing voltage, a first terminal receiving a high voltage level, and a second terminal providing a sensing determination signal; and
    an output switch, having a control terminal receiving a second sensing driving signal, a first terminal coupled to the second terminal of the level switch to receive the sensing determination signal, and a second terminal coupled to a data line.

2. The capacitive fingerprint sensor as claimed in claim 1, wherein the first capacitor comprises a first electrode and a second electrode, the first electrode is coupled to the second terminal of the writing switch, and the second electrode is coupled to the common voltage.

3. The capacitive fingerprint sensor as claimed in claim 1, wherein the first sensing driving signal is enabled during the sensing period, and the second sensing driving signal is enabled during the reading period.

4. The capacitive fingerprint sensor as claimed in claim 3, wherein the first terminal of the level switch receives the high voltage level of the second sensing driving signal during the reading period.

5. The capacitive fingerprint sensor as claimed in claim 3, wherein the reading period is next to the sensing period.

6. A sensing panel, comprising:
    a plurality of driving lines;
    a plurality of data lines; and
    a plurality of the capacitive fingerprint sensors, respectively comprising:
    a sensing circuit, having a first capacitor and a writing switch, wherein the first capacitor provides a sensing voltage according to a first sensing driving signal, and the writing switch, a control terminal and a first terminal of the writing switch are coupled to a first driving line to receive the first sensing driving signal transmitted by the first driving line, and the first capacitor is coupled between a second terminal of the writing switch and a common voltage, wherein the common voltage is a reference voltage during a sensing period, and the common voltage is a sum of the reference voltage and a compensation voltage during a reading period;
    a level switch, having a control terminal coupled to the sensing circuit to receive the sensing voltage, a first terminal receiving a high voltage level, and a second terminal providing a sensing determination signal; and
    an output switch, having a control terminal receiving a second sensing driving signal, a first terminal coupled to the second terminal of the level switch to receive the sensing determination signal, and a second terminal coupled to a corresponding data line,
    wherein the plurality of the capacitive fingerprint sensors respectively coupled to the first driving line and a second driving line in the driving lines and the corresponding data line, and providing the sensing determination signal to the corresponding data line according to the first sensing driving signal transmitted by the first driving line and the second sensing driving signal transmitted by the second driving line.

* * * * *